United States Patent
Niesten et al.

(10) Patent No.: US 7,732,055 B2
(45) Date of Patent: *Jun. 8, 2010

(54) TWO-COMPONENT POLYURETHANE COMPOSITIONS CONTAINING OH-FUNCTIONAL POLYDIMETHYLSILOXANES

(75) Inventors: Meike Niesten, Köln (DE); Jörg Tillack, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/512,489

(22) Filed: Aug. 30, 2006

(65) Prior Publication Data
US 2007/0054134 A1 Mar. 8, 2007

(30) Foreign Application Priority Data
Sep. 3, 2005 (DE) .................. 10 2005 041 925

(51) Int. Cl.
B32B 27/00 (2006.01)
C08L 83/04 (2006.01)
C08G 77/04 (2006.01)

(52) U.S. Cl. ...................... 428/447; 528/28; 528/29
(58) Field of Classification Search ............ 528/73
See application file for complete search history.

(56) References Cited

U.S. PATENT DOCUMENTS

| | | | | |
|---|---|---|---|---|
| 3,449,281 A * | 6/1969 | Sullivan et al. | ........ | 428/391 |
| 4,774,278 A | 9/1988 | Yoshioka et al. | ........ | 524/506 |
| 4,826,921 A * | 5/1989 | Andrews et al. | ........ | 525/102 |
| 5,066,720 A | 11/1991 | Ohsugi et al. | ........ | 525/100 |
| 5,430,083 A | 7/1995 | Klier et al. | ........ | 524/265 |
| 5,691,439 A | 11/1997 | Slack et al. | ........ | 528/49 |
| 6,475,568 B1 | 11/2002 | Czech | ........ | 427/386 |
| 6,602,972 B1 * | 8/2003 | Schwarte et al. | ........ | 528/45 |
| 7,005,055 B2 * | 2/2006 | Kumagai et al. | ........ | 205/296 |
| 2004/0054112 A1 | 3/2004 | Smith | ........ | 528/10 |
| 2004/0149583 A1* | 8/2004 | Kumagai et al. | ........ | 205/76 |
| 2004/0210010 A1 | 10/2004 | Smith | ........ | 525/476 |
| 2005/0222368 A1* | 10/2005 | Reiners et al. | ........ | 528/73 |
| 2005/0252778 A1* | 11/2005 | Kumagai et al. | ........ | 205/76 |
| 2006/0035031 A1 | 2/2006 | Smith | ........ | 427/387 |
| 2006/0047090 A1 | 3/2006 | Smith | ........ | 525/474 |
| 2006/0047091 A1 | 3/2006 | Smith | ........ | 525/474 |
| 2006/0084767 A1 | 4/2006 | Smith | ........ | 525/474 |
| 2006/0184147 A1* | 8/2006 | Hamed | ........ | 604/367 |
| 2007/0020452 A1* | 1/2007 | Hamed et al. | ........ | 428/359 |

OTHER PUBLICATIONS

Farbe und Lack, vol. 105, Aug. 1999, Gerhard Reusmann, pp. 40, 42, 44, 46 and 47, Neue Klasse von Lackzusatzstoffen gegen Graffiti im Einsatz.
Paintindia, Oct. 1996, Jay W. Adams, pp. 31-32 and 34-37, "Organosilicone surfactants: Properties, chemistry, applications".

* cited by examiner

*Primary Examiner*—Randy Gulakowski
*Assistant Examiner*—Robert Loewe
(74) *Attorney, Agent, or Firm*—Connolly Bove Lodge & Hutz LLP

(57) ABSTRACT

The present invention relates to two-component compositions containing
A) hydroxyl-containing polydimethylsiloxanes having number average molecular weights of 400 to 3000 and an average OH functionality of $\geq 1.8$, and containing at least one structural unit of formula I)

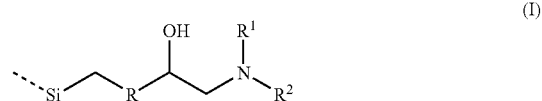

wherein
R is an aliphatic, linear or branched $C_1$ to $C_{20}$ radical,
$R^1$ is a linear or branched hydroxyalkyl radical having 2 to 10 carbon atoms and
$R^2$ is either hydrogen or a linear or branched hydroxyalkyl radical having 2 to 10 carbon atoms,
B) polyhydroxyl compounds other than A) or polyamines, and
C) polyisocyanates.

The present invention also relates to coatings, adhesives or sealants obtained from these compositions.

15 Claims, No Drawings

TWO-COMPONENT POLYURETHANE COMPOSITIONS CONTAINING OH-FUNCTIONAL POLYDIMETHYLSILOXANES

BACKGROUND OF THE INVENTION

1. Field of the Invention

The present invention relates to two-component, polyurethane compositions containing hydroxyl-functional polydimethylsiloxanes and to their use for preparing coatings, adhesives or sealants.

2. Description of Related Art 2K (two-component) PU (polyurethane) paints and coatings combine high mechanical strength with effective resistance to solvents and chemicals. On the basis of their outstanding technological properties, 2K PU paints and coatings are employed for a multiplicity of applications from a very wide variety of fields, such as large-vehicle finishing, automotive refinish, coil coating, corrosion control, floor coating, and adhesives.

The modification of 2K PU paint systems with polydimethylsiloxanes (PDMS) is known. The high surface tension of PDMS produces specific properties, such as good surface wetting, slip resistance and an easy-to-clean surface (Reusmann in Farbe und Lack, 105, volume 8/99, pages 40-47; Adams in Paintindia, October 1996, pages 31-37).

In order to ensure effective incorporation of PDMS and to substantially prevent migration of the PDMS, organofunctional PDMS types, such as alkyleneamine- or alkylenehydroxyl-functional PDMS derivatives, are often used. Paint systems of this kind are described for example in WO91/18954, EP-A 0 329 260 or U.S. Pat. No. 4,774,278.

The amine-functional PDMS types, however, have the disadvantage that the pot life of polyurethane systems based on them is extremely abbreviated, due to the high propensity to form ureas.

Although the known hydroxyl-functional PDMS types give improved pot lives, they generally exhibit incompatibilities with the polyisocyanate component, meaning that homogeneous films cannot be produced and that crosslinking is incomplete. As a result there is free, unbound PDMS in the paint, which migrates over time from the coating and leads to a deterioration in the coating's properties.

U.S. Pat. No. 6,475,568 describes the use of copolyols obtained by reaction of epoxy- functional PDMS oligomers and primary or secondary amines as an additive for cosmetics products or fabric softeners. The use of these compounds for preparing 2K PU binders for paints and coatings is not described.

WO 2004/022619 describes the use of chain extenders for polyurea systems which are obtained by reacting epoxy-functional PDMS with amines. The reaction of epoxy-functional PDMS with hydroxylamines to form the corresponding OH-functional compounds is not described.

SUMMARY OF THE INVENTION

The present invention relates to two-component compositions containing

A) hydroxyl-containing polydimethylsiloxanes having number average molecular weights of 400 to 3000 and an average OH functionality of $\geq 1.8$, and containing at least one structural unit of formula I)

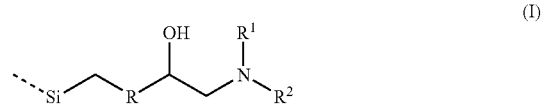

wherein
R is an aliphatic, linear or branched $C_1$ to $C_{20}$ radical,
$R^1$ is a linear or branched hydroxyalkyl radical having 2 to 10 carbon atoms and
$R^2$ is either hydrogen or a linear or branched-hydroxyalkyl radical having 2 to 10 carbon atoms, B) polyhydroxyl compounds other than A) or polyamines, and C) polyisocyanates.

The present invention also relates to coatings, adhesives or sealants obtained from these compositions.

DETAILED DESCRIPTION OF THE INVENTION

Component A) is preferably used in an amount of 0.01% to 20% by weight, more preferably 0.1% to 10%, and component B) is preferably used in an amount of 80% to 99.99% by weight, more preferably 90% to 99.90% by weight, wherein these percentages are based on the total weight of components A) and B).

Preferably, the equivalent ratio of NCO groups to OH and/or NH-functional groups is 0.5:1 to 2.0:1, more preferably 0.8:1 to 1.5:1.

Preferably, hydroxyl-containing polydimethylsiloxanes A) have an average OH functionality of 1.9 to 6. These hydroxyl-containing polydimethylsiloxanes are obtained by reacting the corresponding epoxy-functional polydimethylsiloxanes with hydroxylamines, preferably at an equivalent ratio of epoxy groups to NH groups of 1:1. The epoxy-functional polydimethylsiloxanes preferably contain 1 to 4 epoxy groups per molecule. Additionally, they preferably have number average molecular weights of 150 to 2800, more preferably 250 to 2000.

More preferably the epoxy-functional polydimethylsiloxanes are α,ω-epoxy-dimethylsiloxanes which have the preceding molecular weights, have an average of 2 epoxy groups per molecule, and correspond to formula II)

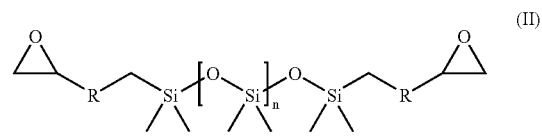

wherein
R is a linear or branched, aliphatic $C_1$ to $C_{10}$ radical and
n an integer from 1 to 25.

Products of this kind are available commercially from, for example, GE Bayer Silicones, Leverkusen, Germany, Tego, Essen, Germany or Wacker, Munich, Germany.

The hydroxylamines correspond to formula III)

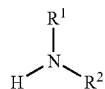

(III)

wherein

R¹ is a linear or branched hydroxyalkyl radical having 2 to 10 carbon atoms and

R² is either hydrogen or a linear or branched hydroxyalkyl radical having 2 to 10 carbon atoms.

Preferred hydroxylamines are ethanolamine, propanolamine, diethanolamine and dipropanolamine. Particular preference is given to diethanolamine.

To prepare the modified siloxanes of component A) the epoxy-functional siloxane is introduced into a vessel, optionally in a solvent, and then reacted with the hydroxylamine or a mixture of two or more hydroxylamines. The reaction temperature is preferably 20 to 150° C. and is carried on until free epoxy groups are no longer detected.

Suitable polyhydroxyl compounds for use as component B) are known and include polyacrylate, polyester, polyether, polycarbonate or polyester carbonate polyols, castor oil, or blends of castor oil with ketone/formaldehyde condensates, e.g., those described in GB-PS 1 182 884 or EP-A-0 364 738, or mixtures of these polyhydroxyl compounds.

The polyhydroxy polyacrylates are hydroxyl-containing copolymers of olefinically unsaturated compounds having a molecular weight, $M_n$, as determined by vapor-pressure osmometry or membrane osmometry, of 800 to 50,000, preferably 1000 to 20,000 and more preferably 5000 to 10,000, and having a hydroxyl content of 0.1% to 12%, preferably 1% to 10% and more preferably 2% to 6% by weight.

The polyhydroxy polyacrylates are copolymers of hydroxyl-containing olefinic monomers with hydroxyl-free olefinic monomers. Examples of suitable monomers include vinyl or vinylidene monomers such as styrene, α-methylstyrene, o- or p-chlorostyrene, o-, m- or p-methylstyrene, p-tert-butylstyrene, acrylic acid and (meth)acrylonitrile; acrylic and methacrylic esters having 1 to 8 carbon atoms in the alcohol component such as ethyl acrylate, methyl acrylate, n- or isopropyl acrylate, n-butyl acrylate, 2-ethylhexyl acrylate, 2-ethylhexyl methacrylate, isooctyl acrylate, methyl methacrylate, ethyl methacrylate, butyl methacrylate and isooctyl methacrylate; diesters of fumaric acid, itaconic acid or maleic acid having 4 to 8 carbon atoms in the alcohol component; (meth)acrylamide, vinyl esters of alklanemonocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl radical such as 2-hydroxyethyl, 2-hydroxypropyl, 4-hydroxybutyl, trimethylolpropane and pentaerythritol monoacrylate or monomethacrylate. Mixtures of these monomers can also be used for preparing the hydroxy-functional polyacrylates.

Suitable polyester polyols are those having a number average molecular weight, which may be calculated from the functionality and hydroxyl number, of 200 to 3000, preferably of 250 to 2500, and a hydroxyl content of 1% to 21% by weight, preferably 2% to 18% by weight. The polyester polyols may be prepared in conventional manner by reacting polyhydric alcohols with substoichiometric amounts of polybasic carboxylic acids, the corresponding carboxylic anhydrides, polycarboxylic esters of lower alcohols or lactones.

Polyhydric alcohols suitable for preparing the polyester polyols are those having a molecular weight of 62 to 400 such as 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl)isocyanurate.

The acids or acid derivatives used to prepare the polyester polyols may be aliphatic, cycloaliphatic and/or heteroaromatic acids and may optionally be substituted, by halogen atoms for example, and/or unsaturated. Examples of suitable acids include polybasic carboxylic acids having a molecular weight of 118 to 300 or their derivatives, such as succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate and bisglycol terephthalate.

For preparing the polyester polyols it is also possible to use mixture of the preceding starting compounds.

Also suitable are polyester polyols prepared in conventional manner from lactones and low molecular weight polyhydric alcohols, such as those described above, as starter molecules in a ring opening reaction. Examples of suitable lactones for preparing these polyester polyols include β-propiolactone, γ-butyrolactone, γ- and δ-valerolactone, ε-caprolactone, 3,5,5- and 3,3,5-trimethylcaprolactone or mixtures thereof.

Examples of suitable polyether polyols are those having a number average molecular weight, which may be calculated from the functionality and hydroxyl number, of 200 to 6000, preferably 250 to 4000, having a hydroxyl content of 0.6% to 34% by weight, preferably 1% to 27% by weight, and obtained in conventional manner by alkoxylating suitable starter molecules. To prepare these polyether polyols it is possible to use any desired polyhydric alcohols as starter molecules, preferably those having a molecular weight of 62 to 400, such as those described above for the preparation of the polyester polyols.

Alkylene oxides suitable for the alkoxylation reaction include ethylene oxide and propylene oxide, which can be employed. in any order or as a mixture for the alkoxylation reaction.

Preferred polyether polyols are those in which at least 80 mol %, preferably 100 mol %, of the alkylene oxide units are propylene oxide units.

Suitable polyhydroxyl polycarbonates are the known polycarbonate diols, which may be prepared by reacting dihydric alcohols, such as those exemplified above for preparing the polyester polyols, preferably having a molecular weight of 62 to 400, with diaryl carbonates, such as diphenyl or dimethyl carbonate, or phosgene.

The polycarbonate polyols have a number average molecular weight, which may be calculated from the hydroxyl group content and hydroxyl group functionality, of 250 to 1000.

Suitable polyhydroxyl polyester carbonates are the known polyols, preferably diols that contain ester groups and carbonate groups. They may be obtained in accordance with the DE-B 1 770 245 by the reaction of dihydric alcohols with the lactones described above, particularly ε-caprolactone, and subsequent reaction of the resulting polyester diols with diphenyl or dimethyl carbonate. These polyhydroxyl compounds preferably have a number average molecular weight, which may be calculated from the hydroxyl group content and hydroxyl group functionality, of 500 to 3000.

In addition to the preceding high molecular weight polyhydroxyl compounds, polyol component B) may also include up to 50% by weight, preferably up to 20% by weight, based on the total amount of component B), of low molecular weight polyhydric alcohols, optionally containing ether oxygen, for the purpose of controlling the viscosity of the two-component coating compositions of the invention. These polyhydric alcohols, which preferably have a molecular weight of 62 to 199 g/mol, include 1,2-ethanediol, 1,2- and 1,3-propanediol, 1,4-butanediol, diethylene glycol, dipropylene glycol, or mixtures of any of the polyhydric alcohols.

Polyamines B) include diprimary aromatic diamines containing ortho to each amino group at least one alkyl substituent having 2 to 3 carbon atoms and optionally methyl substituents in other positions ortho to the amino groups. These compounds preferably have a molecular weight of 178 to 346 g/mol. Typical examples of these aromatic diamines include 1-methyl-3,5-diethyl-2,4-diamino-benzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane or mixtures thereof.

Other suitable polyamines are amino-functional polyaspartic esters of formula IV)

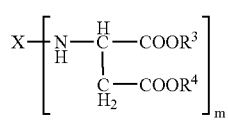

(IV)

wherein

X is an n-valent organic radical obtained by removing the primary amino groups of an n-functional polyamine, $R^3$ and $R^4$ are identical or different organic radicals inert towards isocyanate groups under the reaction conditions, and m is an integer which is at least 2.

The group X in formula (IV) is preferably from an m-functional polyamine such as ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane and polyether polyamines having aliphatically bound primary amino groups and a number average molecular weight $M_n$ of 148 to 6000.

More preferably group X is based on 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

In reference to radicals $R^3$ and $R^4$, the phrase "inert towards isocyanate groups under the reaction conditions" means that these radicals contain no groups with Zerewitinoff-active hydrogen (CH-acidic compounds; cf. Römpp Chemie Lexikon, Georg Thieme Verlag Stuttgart) such as OH, NH or SH.

Preferably $R^3$ and $R^4$ independently of one another are $C_1$ to $C_{10}$ alkyl radicals, more preferably methyl or ethyl radicals.

If X is based on 2,4,4'-triamino-5-methyldicyclohexylmethane, then preferably both $R^3$ and $R^4$ are ethyl radicals.

Preferably m in formula IV) is an integer from 2 to 6, more preferably 2 to 4.

The amino-functional polyaspartic esters are prepared in conventional manner by reacting the corresponding primary polyamines of the formula

with maleic or fumaric esters of the formula

wherein X, $R^3$ and $R^4$ are as defined above.

Examples of suitable maleic or fumaric esters of formula VI) include dimethyl maleate, diethyl maleate, dibutyl maleate and the corresponding fumarates.

The preparation of the amino-functional polyaspartic esters from the starting materials takes place preferably within the temperature range from 0 to 100° C., the starting materials being employed in proportions such that for each primary amino group there is at least one, preferably one, olefinic double bond; after the reaction, any starting materials employed in excess can be separated off by distillation. The reaction can take place in bulk (without solvent) or in the presence of suitable solvents such as methanol, ethanol, propanol or dioxane or mixtures of such solvents.

Besides the amino-functional polyaspartic esters, other compounds B) include compounds having a number average molecular weight $M_n$ of 112 to 6500 and containing per molecule at least two structural units of formula VII)

(VII)

These optional compounds with masked amino groups, which are known as polyaldimines or polyketimines, have a number average molecular weight $M_n$ of 112 to 6500, preferably 140 to 2500 and more preferably 140 to 458 g/mol. If not readily determined as the sum of the atomic weights of the individual elements, the molecular weight can be calculated, for example, from the functionality and the functional group content (by determining the primary amino groups present after hydrolysis) or, in the case of relatively high molecular weight compounds, can be determined by gel permeation chromatography using polystyrene as the standard.

The preferred polyaldimines or polyketimines include compounds of the general structural formula (VIII)

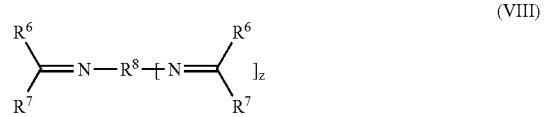

(VIII)

wherein $R^6$ and $R^7$ independently of one another are hydrogen or hydrocarbon radicals having up to 20 carbon atoms, or $R^6$ and $R^7$, together with the carbon atom, may form a 5- or 6-membered cycloaliphatic ring, $R^8$ is a (z+1)-valent radical obtained by removing the primary amino groups from a corresponding polyamine optionally containing oxygen atoms and/or nitrogen atoms, and z is an integer from 1 to 3.

Preferably, $R^6$ and $R^7$ independently of one another are alkyl radicals having 1 to 8 carbon atoms. Preferably, the parent polyamine of $R^8$ has a number average molecular weight $M_n$ of 88 to 2000. More preferably in the compounds of formula VIII), all radicals $R^6$ are hydrogen, radicals $R^7$ are hydrocarbon radicals having 1 to 8 carbon atoms, and z=1.

The aldehydes or ketones which can be used for preparing the polyaldimines or polyketimines, respectively, correspond to formula IX)

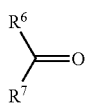

(IX)

and have preferably a molecular weight of 44 to 128 g/mol (aldehydes) or 58 to 198 g/mol (ketones).

Examples of suitable aldehydes include acetaldehyde, propionaldehyde, n-butyraldehyde, isobutyraldehyde, trimethyl acetate aldehyde, 2,2-dimethylpropanal, 2-ethylhexanal, 3-cyclohexane-1-carboxaldehyde, hexanal, heptanal, octanal, valeraldehyde, benzaldehyde, tetrahydrobenzaldehyde, hexahydrobenzaldehyde, propargyladehyde, p-tolylaldehyde, phenylethanal, 2-methylpentanal, 3-methylpentanal, 4-methylpentanal and sorbaldehyde. Preferred are n-butyraldehyde, isobutyraldehyde, trimethlyacetaldehyde, 2-ethylhexanal and hexahydrobenzaldehyde.

Examples of suitable ketones include acetone, methyl ethyl ketone, methyl propyl ketone, methyl isopropyl ketone, methyl butyl ketone, methyl isobutyl ketone, methyl tert-butyl ketone, methyl n-amyl ketone, methyl isoamyl ketone, methyl heptyl ketone, methyl undecyl ketone, diethyl ketone, ethyl butyl ketone, ethyl amyl ketone, diisopropyl ketone, diisobutyl ketone, cyclohexanone, cyclopentanone, methylcyclohexanone, isophorone, 5-methyl-3-heptanone, 1-phenyl-2-propanone, acetophenone, methyl nonyl ketone, dinoyl ketone, and 3,3,5-trimethlycyclohexanone. Preferred ketones are cyclopentanone, cyclohexanone, methylcyclopentanone, methylcyclohexanone, 3,3,5-trimethylcyclopentanone, cyclobutanone, methylcyclobutanone, acetone, methyl ethyl ketone and methyl isobutyl ketone.

It is also possible to use mixtures of different ketones or aldehydes, and also mixtures of ketones with aldehydes, in order to obtain specific properties.

The polyamines employed for preparing the polyaldimines or polyketimines are organic compounds containing at least two and preferably 2 (z=1) aliphatically and/or cycloaliphatically bound primary amino groups. The use of amines containing aromatically bound amino groups is less preferred. The polyamines preferably have a number average molecular weight of 60 to 6000, more preferably 88 to 2000 and most preferably 88 to 238 g/mol. Examples of suitable polyamines for preparing these polyaldimines or polyketimines are the polyamines previously described for use in component B). For preparing component B) and the optional polyaldimines or polyketimines it is possible in each case to use different polyamines.

The polyaldimines or polyketimines are prepared according to conventional methods by reaction of the starting components at an equivalent ratio of amino groups to aldehyde or keto groups of 1:1 to 1:1.5. The reaction can optionally be accelerated using catalytic amounts of acidic substances such as p-toluene-sulphonic acid, hydrogen chloride, sulphuric acid or aluminium chloride. The reaction preferably takes place at a temperature of 20 to 180° C., and is carried out, with or without the use of an azeotrope former (e.g. toluene, xylene, cyclohexane and octane) to remove the water of reaction until the calculated amount of water (1 mole of water per mole of primary amino group) has been eliminated or until water is no longer eliminated. Thereafter the phases are separated or the azeotrope former and any unreacted starting materials present are separated off by distillation.

Suitable polyisocyanates C) are organic polyisocyanates having an average NCO functionality of at least 2 and a number average molecular weight of at least 140. Examples include i) unmodified, monomeric organic polyisocyanates having a number average molecular weight of 140 to 300, ii) lacquer polyisocyanates having a number average molecular weight of 300 to 1000, and iii) NCO prepolymers containing urethane groups and having a number average molecular weights of >1000, or mixtures of i) to iii).

Examples of polyisocyanates i) include 1,4-diisocyanatobutane, 1,6-diisocyanatohexane (HDI), 1,5-diisocyanato-2,2-dimethylpentane, 2,2,4- and 2,4,4-trimethyl-1,6-diisocyanatohexane, 1-isocyanato-3,3,5-trimethyl-5-isocyanatomethylcyclohexane (IPDI), 1-isocyanato-1-methyl-4-(3)-isocyanatomethylcyclohexane, bis(4-isocyanatocyclohexyl)methane, 1,10-diisocyanatodecane, 1,12-diisocyanatododecane, cyclohexane 1,3- and 1,4-diisocyanate, xylylene diisocyanate isomers, triisocyanatononane (TIN), 2,4-diisocyanatotoluene or mixtures with 2,6-diisocyanatotoluene, preferably mixtures with up to 35% by weight of 2,6-diisocyanatotoluene, 2,2'-, 2,4'-, 4,4'-, diisocyanatodiphenylmethane, polyisocyanate mixtures of the diphenylmethane series, and mixtures thereof. Preferred are the polyisocyanates of the diphenylmethane series, more preferably in the form of isomer mixtures.

Polyisocyanates of group ii) are the known lacquer polyisocyanates, which are compounds or mixtures of compounds obtained by the conventional oligomerization reaction of the monomeric diisocyanates exemplified under i). Examples of suitable oligomerization reactions are carbodiimidization, dimerization, trimerization, biuretization, urea formation, urethanization, allophanatization and/or cyclization with the formation of oxadiazine groups. In an "oligomerization" reaction often two or more of the reactions proceed simultaneously or in succession.

Lacquer polyisocyanates ii) are preferably biuret polyisocyanates, polyisocyanates containing isocyanurate groups, polyisocyanate mixtures containing isocyanurate and uretdione groups, polyisocyanates containing urethane and/or allophanate groups, and polyisocyanate mixtures based on monomeric diisocyanates and containing isocyanurate and allophanate groups.

The preparation of these lacquer polyisocyanates is known and is described for example in DE-A 1 595 273, DE-A 3 700 209 and DE-A 3 900 053 or in EP-A-0 330 966, EP-A 0 259 233, EP-A-0 377 177, EP-A-0 496 208, EP-A-0 524 501 or U.S. Pat. No. 4,385,171.

Polyisocyanates iii) are the known prepolymers containing isocyanate groups that are prepared by reacting monomeric diisocyanates i) and/or lacquer polyisocyanates ii) with organic polyhydroxyl compounds having a number average molecular weight of above 300. The lacquer polyisocyanates ii) that contain urethane groups are prepared from low molecular weight polyols having a number average molecular weight of 62 to 300 such as ethylene glycol, propylene glycol, trimethylolpropane, glycerol or mixtures of these alcohols.

To the contrary the NCO prepolymers iii) are prepared using polyhydroxyl compounds having number average molecular weights of above 300, preferably above 500, and more preferably from 500 to 8000. Preferred polyhydroxyl compounds are those having per molecule 2 to 6, preferably 2 to 3, hydroxyl groups such polyether, polyester, polythioether, polycarbonate and polyacrylate polyols and mixtures of these polyols.

It is also possible to prepare NCO prepolymers iii) from mixtures of high molecular weight polyols and low molecular weight polyols, resulting in mixtures of low molecular weight lacquer polyisocyanates ii) containing urethane groups and NCO prepolymers iii), which are also suitable as starting component (C) according to the invention.

NCO prepolymers iii) or mixtures thereof with lacquer polyisocyanates ii) are prepared by reacting polyisocyanates i) or lacquer polyisocyanates ii) with the high molecular weight polyhydroxyl compounds or mixtures thereof with low molecular weight polyhydroxyl compounds at an NCO/OH equivalent ratio of 1.1:1 to 40:1, preferably 2:1 to 25:1, to form urethane groups. Optionally, when using an excess of distillable starting diisocyanate, this excess can be removed by distillation following the reaction to provide monomer-free NCO prepolymers. When they are not removed by distillation, mixtures of starting diisocyanates i) and NCO prepolymers iii) are obtained, which may also be used as component A).

Low-viscosity, hydrophilic polyisocyanates containing free isocyanate groups and prepared from aliphatic, cycloaliphatic, araliphatic and/or aromatic isocyanates, preferably aliphatic or cycloaliphatic isocyanates, can also be used.

Hydrophilic polyisocyanates can be prepared, for example, by reacting polyisocyanates with substoichiometric amounts of monohydric, hydrophilic polyether alcohols. The preparation of these hydrophilic polyisocyanates is described, for example, in EP-A 0 540 985, p. 3, 1. 55-p. 4 1. 5. Also suitable are the polyisocyanates containing allophanate groups that are described in EP-A-959087, p. 3 11. 39-51, which are prepared by reacting low monomer content polyisocyanates with polyethylene oxide polyether alcohols under allophanatization conditions. Also suitable are the triisocyanatononane-based, water-dispersible polyisocyanate mixtures described in DE-A 100 078 21, p. 2 1. 66-p. 3 1. 5, and also hydrophilic polyisocyanates containing ionic groups (sulphonate groups, phosphonate groups) described for example in DE 10024624, p 3 1. 13-33. Also suitable hydrophilic potyisocyanates rendered hydrophilic by blending with known external emulsifiers.

It is also possible to use blocked polyisocyanates as component C). Preferably, however, unblocked polyisocyanates are used. Preferred polyisocyanates C) are polyisocyanates ii) and mixtures thereof.

Known coating additives may optionally be present and include surface-active substances, internal release agents, fillers, dyes, pigments, flame retardants, hydrolysis inhibitors, microbiocides, flow control assistants, solvents, antioxidants such as 2,6-di-tert-butyl-4-methylphenol, UV absorbers of the 2-hydroxy-phenylbenzotriazole type, or light stabilizers of the HALS type unsubstituted or substituted on the nitrogen atom (such as Tinuvin® 292 and Tinuvin® 770 DF, Ciba Spezialitäten GmbH, Lampertheim, Del.), other known stabilizers (such as those described, for example, in "Lichtschutzmittel für Lacke," A. Valet, Vincentz Verlag, Hanover, 1996 and "Stabilization of Polymeric Materials," H. Zweifel, Springer Verlag, Berlin, 1997, Appendix 3, pp. 181-213), and mixtures of these additives.

Examples of suitable solvents include esters such as ethyl acetate, butyl acetate, methoxypropyl acetate, methyl glycol acetate, ethyl glycol acetate and diethylene glycol monomethyl ether acetate; ketones such as methyl ethyl ketone, methyl isobutyl ketone and methyl amyl ketone; aromatics such as toluene. and xylene; and also the relatively high boiling hydrocarbon mixtures known from coatings chemistry.

To prepare the two-component binders of the invention the individual components are mixed with one another.

If necessary it is possible to use the known catalysts from polyurethane chemistry to accelerate the NCO/OH or NH reaction. Examples suitable catalysts include organometallic compounds, amines (e.g. tertiary amines), or metal compounds such as lead octoate, mercury succinate, tin octoate or dibutyltin dilaurate.

The coating compositions can be applied to surfaces using known techniques, such as spraying, dipping, flow coating, rolling, spreading or pouring. Following flashing off to remove any solvents present, the coatings are cured under ambient conditions or at higher temperatures of, for example, 40 to 200° C.

The coating compositions can be applied any substrates such as metals, plastics, ceramic, glass and also natural materials. The substrates may have undergone any necessary pretreatment beforehand.

The invention is further illustrated but is not intended to be limited by the following examples in which all parts and percentages are by weight unless otherwise specified.

EXAMPLES

The dynamic viscosities were determined at 23° C. using a rotational viscometer (ViscoTester® 550, Thermo Haake GmbH, D-76227 Karlsruhe).

The OH number was determined in accordance with DIN 53240 P.2.

The epoxide group content was determined in accordance with DIN 16945, and is based on a molar weight of 42 g/mol.

The gloss was measured in accordance with DIN 67530.

Haze was determined in accordance with DIN 67530.

The König pendulum hardness was determined in accordance with DIN 53157 after storage for 7 days at room temperature.

The easy-to-clean properties were determined by applying a Lumocolor Permanent Marker 350 (Staedler, Nuremberg, Del.) in red and leaving it to act for 1 minute. Attempts were then made to remove the mark with a dry cellulosic paper cloth and with a cellulosic paper cloth wetted in ethanol.

Starting Materials
MPA: Methoxypropyl acetate
DBTL: Dibutyltin dilaurate
Tego Twin 4000: Polydimethylsiloxane-based flow control additive, Goldschmidt, Essen, Del.

Preparation of Polyol I:
770 g of an epoxide of the formula

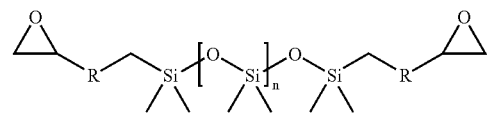

which has a number average molecular weight of 700 and wherein R is $CH_2$, were introduced into a vessel and 231 g of diethanolamine were added. The mixture was subsequently stirred at 100° C. for 2 hours. The product was free of epoxy groups, and had an OH number of 370 mg KOH/g and a viscosity at 23° C. of 2900 mPa·s.

Comparative polyol I:

For comparison, polyols of the formula

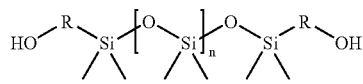

were used. Their properties are summarized in the table below:

| Comparative polyols | Baysilone OF/OH502 6% | Baysilone OF/OH 502 3% | Wacker IM11 | Tegomer HSi 2311 |
|---|---|---|---|---|
| Manufacturer | GE Bayer Silicones | GE Bayer Silicones | Wacker | Tego |
| R = | $CH_2$ | $CH_2$ | $CH_2CH(CH_3)$ | $(CH_2)_3$ |
| Viscosity at 25° C. (mPa · s) | 20-50 | 20-50 | 20-50 | 20-50 |
| OH number (mg KOH/g) | 198 | 99 | 96 | 36 |
| Molecular weight (g/mol) | 566 | 1133 | 1172 | 2946 |

Polyol II: branched, short-chain polyester polyol having an OH number of 512 mg KOH/g and a viscosity at 23° C. of 1900 mPa·s (Desmophen VPLS 2249/1, Bayer MaterialScience AG, Leverkusen, Del.).

Polyisocyanate: Biuret polyisocyanate prepared from 1,6-hexane diisocyanate and having an NCO content of 23% by weight and a viscosity at 23° C. of 2500 mPa.s (Desmodur N3200, Bayer MaterialScience AG, Leverkusen, Del.).

Preparation of Coating Composition

The components were admixed as set forth in the table below with known coating additives, catalysts and polyisocyanates, with stirring, then applied to glass using a 50 μm doctor blade, and cured at 100° C. for 60 minutes.

| | Example | | | | | |
|---|---|---|---|---|---|---|
| | 1 | 2 | 3 | 4 | 5 | 6 |
| Polyol I | 5 | | | | | |
| Baysilone OF/OH 502 6% | | 5 | | | | |
| Baysilone OF/OH 502 3% | | | 5 | | | |
| Wacker IM 11 | | | | 5 | | |
| Tegomer Esi 2311 | | | | | 5 | |
| Polyol II | 95 | 100 | 95 | 95 | 95 | 95 |
| Tego Twin 4000 | 0.1 | 0.03 | 0.03 | 0.03 | 0.03 | 0.03 |
| DBTL | 0.1 | 0.03 | 0.03 | 0.03 | 0.03 | 0.03 |
| Desmodur N3200 | 164 | 166 | 161 | 159 | 159 | 159 |
| Pendulum hardness | 100 | 149 | 111 | 71 | 99 | 84 |
| Gloss | 86 | 86 | 85 | 84 | 84 | 83 |
| Haze | 13 | 12 | <10 | <10 | 11 | 17 |
| Fog on glass plate | 0 | 0 | 2 | 5 | 4 | 5 |

-continued

| | Example | | | | | |
|---|---|---|---|---|---|---|
| | 1 | 2 | 3 | 4 | 5 | 6 |
| Easy to clean | | | | | | |
| Dry | 1 | 4 | 3 | 3 | 3 | 3 |
| Ethanol | 1 | 3 | 3 | 3 | 2 | 3 |

0 = good,
5 = poor; amounts in grams

The inventive composition of Example 1 gave a clear film having a smooth surface and good easy-to-clean properties.

Comparative Example 2 contained no silicone component and had no notable easy-to-clean properties. Comparative Examples 3 to 6, although containing just as much OH-functional siloxane as in Example 1, nevertheless had poorer easy-to-clean properties and poorer optical film properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component composition consisting of
    A) a hydroxyl-containing polydimethylsiloxane having a number average molecular weight of 400 to 3000 and an average OH functionality of $\geq 1.8$, and containing at least one structural unit of formula (I)

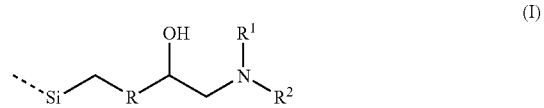

wherein R is an aliphatic, linear or branched $C_1$ to $C_{20}$ radical, $R^1$ is a linear or branched hydroxyalkyl radical having 2 to 10 carbon atoms and $R^2$ is either hydrogen or a linear or branched hydroxyalkyl radical having 2 to 10 carbon atoms,
    B) a polyhydroxyl compound other than A) or a polyamine, and
    C) a polyisocyanate.

2. The composition of claim 1 wherein component A) is used in an amount of 0.01% to 20% by weight and component B) is used in an amount of 80% to 99.99% by weight, wherein these percentages are based on the total weight of components A) and B).

3. The composition of claim 2 wherein the equivalent ratio of NCO groups to OH and/or NH-functional groups is 0.5:1 to 2.0:1.

4. The composition of claim 3 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

5. The composition of claim 2 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

6. The composition of claim 1 wherein component A) is used in an amount of 0.1% to 10% by weight and component B) is used in an amount of 90% to 99.90% by weight, wherein these percentages are based on the total weight of components A) and B).

7. The composition of claim 6 wherein the equivalent ratio of NCO groups to OH and/or NH-functional groups is 0.5:1 to 2.0:1.

8. The composition of claim 7 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

9. The composition of claim 6 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

10. The composition of claim 1 wherein the equivalent ratio of NCO groups to OH and/or NH-functional groups is 0.5:1 to 2.0:1.

11. The composition of claim 10 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

12. The composition of claim 1 wherein radical $R_1$ is independently selected from the group consisting of —$CH_2$—$CH_2$—OH and —$CH_2$—$CH_2$—$CH_2$—OH and radical $R_2$ is independently selected from the group consisting of H, —$CH_2$—$CH_2$—OH, and —$CH_2$—$CH_2$—$CH_2$—OH.

13. A coating, adhesive or sealant obtained from the composition of claim 1.

14. A substrate that has been coated, bonded or sealed with the composition of claim 1.

15. A two-component composition consisting of
A) a hydroxyl-containing polydimethylsiloxane having a number average molecular weight of 400 to 3000 and an average OH functionality of $\geq 1.8$, and containing at least one structural unit of formula (I)

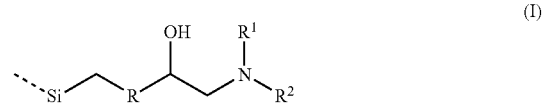

wherein R is an aliphatic, linear or branched $C_1$ to $C_{20}$ radical, $R^1$ is a linear or branched hydroxyalkyl radical having 2 to 10 carbon atoms and $R^2$ is either hydrogen or a linear or branched hydroxyalkyl radical having 2 to 10 carbon atoms,
B) a polyhydroxyl compound other than A) or a polyamine,
C) a polyisocyanate, and
D) one or more surface-active substances, internal release agents, fillers, dyes, pigments, flame retardants, hydrolysis inhibitors, microbiocides, flow control assistants, solvents and/or antioxidants.

* * * * *